United States Patent [19]

Aoki

[11] Patent Number: 5,318,100
[45] Date of Patent: Jun. 7, 1994

[54] AIR CONDITIONING SYSTEM AND METHOD FOR VEHICLES

[75] Inventor: Yorikazu Aoki, Maebashi, Japan

[73] Assignee: Sanden Corporation, Gunma, Japan

[21] Appl. No.: 977,793

[22] Filed: Nov. 17, 1992

[30] Foreign Application Priority Data

Nov. 18, 1991 [JP] Japan .............................. 3-94356[U]
Nov. 18, 1991 [JP] Japan .............................. 3-94394[U]

[51] Int. Cl.$^5$ .............................................. B60H 1/00
[52] U.S. Cl. ......................................... 165/2; 165/42;
  165/43; 165/61; 237/12.3 R; 237/12.3 B;
  237/12.3 A; 122/26; 62/323.1; 62/323.4;
  62/501; 62/243; 126/247
[58] Field of Search .................. 165/42, 43, 61, 2;
  237/12.3 B, 12.3 A, 12.3 R; 122/26; 126/247;
  62/501, 323.1, 323.4, 239, 243

[56] References Cited

U.S. PATENT DOCUMENTS

| | | |
|---|---|---|
| 3,436,839 | 8/1982 | Moser . |
| 3,486,734 | 6/1983 | Weible . |
| 3,983,715 | 10/1976 | Hair, Jr. et al. . |
| 4,069,972 | 1/1978 | Hausmann . |
| 4,172,493 | 10/1979 | Jacobs . |
| 4,192,456 | 3/1980 | Shields et al. . |
| 4,352,455 | 10/1982 | Moser et al. . |
| 4,352,456 | 10/1982 | Brandenburg, Jr. . |
| 4,370,956 | 1/1983 | Moser et al. . |
| 4,371,112 | 2/1983 | Tholen . |
| 4,386,735 | 6/1983 | Tholen et al. . |
| 4,407,449 | 10/1983 | Moser et al. . |
| 4,420,114 | 12/1983 | Moser et al. . |
| 4,432,493 | 2/1984 | Moser et al. . |
| 4,434,934 | 3/1984 | Moser et al. . |
| 4,487,364 | 12/1984 | Okulicz et al. . |
| 5,085,269 | 2/1992 | Aoki . |

FOREIGN PATENT DOCUMENTS

61-122462  6/1986  Japan .

Primary Examiner—John K. Ford
Attorney, Agent, or Firm—Baker & Botts

[57] ABSTRACT

An air conditioning system for a motor crane includes a heating circuit and a refrigerating circuit The heating circuit comprises a hydraulic motor, a hydraulic pump, a radiator and a valve mechanism causing a pressure difference in the hydraulic oil flowing therethrough. The refrigerating circuit includes a compressor connected to the hydraulic motor and a condenser having a fan for forcing air thereover. The heating circuit is at least partially disposed in an air path in which the condenser is disposed. When the hydraulic oil bypasses the valve mechanism, a control device turns the fan on if the refrigerating circuit is not operating, and the temperature of the hydraulic oil sensed by the sensor reaches a predetermined temperature. Further, the system includes a filter downstream of the valve mechanism and a control device for reducing the pressure loss across the valve mechanism to a minimum for a predetermined time when hydraulic oil initially begins flowing through the heating circuit upon start up of the mobile crane.

18 Claims, 7 Drawing Sheets

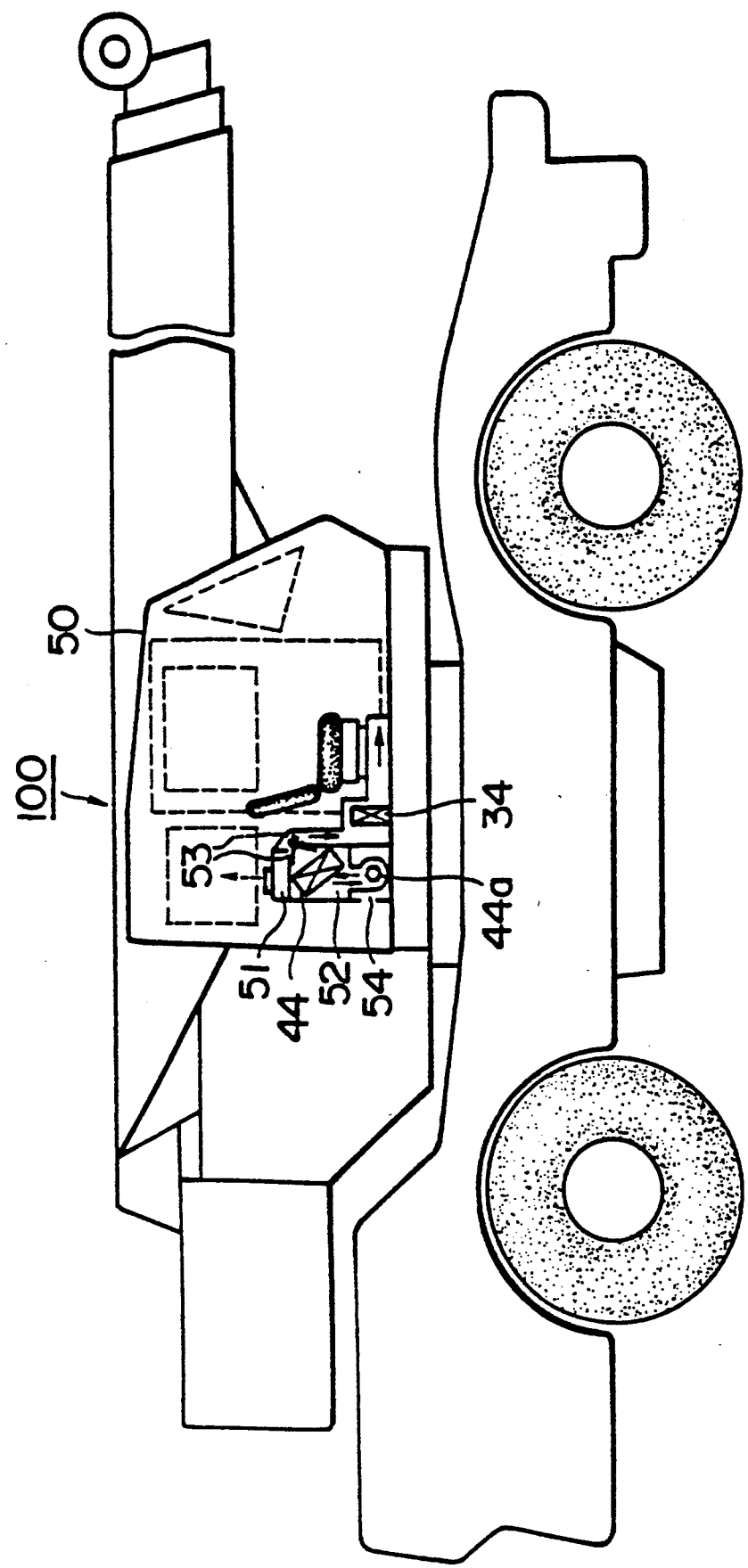

AIR CONDITIONING SYSTEM AND METHOD FOR VEHICLES

BACKGROUND OF THE INVENTION

1. Field of the Invention

The present invention relates to an air conditioning system and method for vehicles, and more particularly to an air conditioning system and method suitable for use in a mobile crane vehicle.

2. Description of the Prior Art

Generally in a work vehicle such as a mobile crane, the cabin is rotatable through an angle of 360°. Consequently, the cooling water for the engine circulating below the cabin cannot be introduced into the cabin, and therefore cannot be used to heat the cabin. Nonetheless, since work vehicles typically have extensive hydraulic circuits, the cabin can utilize the heat of the hydraulic oil in the hydraulic circuit to provide heat thereto.

A typical prior art hydraulic circuit includes an oil tank and a hydraulic pump driven by an engine of the vehicle. The hydraulic pump draws oil from the oil tank and delivers the oil to a hydraulic motor which is driven by the pumped oil. The heating circuit has another hydraulic pump connected to and driven by the hydraulic motor. A valve mechanism (a relief valve) and a solenoid valve are disposed downstream of the hydraulic pump in parallel to each other in the heating circuit.

When the solenoid valve is closed, the hydraulic oil from the hydraulic pump is sent to the valve mechanism. The valve mechanism causes a pressure difference in the hydraulic oil and the hydraulic oil is heated by the pressure difference. A radiator is disposed downstream of the valve mechanism. The heat of the hydraulic oil heated by the pressure difference is radiated by the radiator. Consequently, when in the heating mode, the cabin is heated by the heat radiated from the radiator.

Additionally, the hydraulic circuit can be employed to drive an air conditioning compressor. The typical refrigerating circuit has a compressor, a condenser and an evaporator. The compressor is selectively connected to the hydraulic motor via a clutch mechanism. When the compressor is connected to the hydraulic motor, the compressor is driven and the air conditioning (cooling) is performed.

Further, when a dehumidifying and heating operation is performed, the compressor is connected to the hydraulic motor by closing the clutch mechanism and the solenoid valve in the heating circuit is closed. Thus, both the refrigerating circuit and the heating circuit are operated, and dehumidifying and heating operations are simultaneously performed.

In such a system, when the clutch to the compressor is disengaged and the operation of the heating circuit is stopped, the solenoid valve is opened. Consequently, the hydraulic oil of the heating circuit circulates between the hydraulic pump and the oil tank. Since, in such a state, the hydraulic oil is not supplied to the valve mechanism, the radiator does not radiate the heat of the hydraulic oil. Therefore, the temperature of the hydraulic oil continues to rise, often to an excessive degree.

Additionally, in conventional work vehicles, flushing the heating circuit, that is, the process for removing foreign material from the hydraulic oil is problematic and complicated. For example, in conventional systems, flushing is typically performed by detaching the valve (relief valve) and bypassing the oil path. In addition to the loss of time associated with detaching and reattaching the valve, leakage of the hydraulic oil occurs during flushing.

SUMMARY OF THE INVENTION

Accordingly, an object of the present invention is to provide an air conditioning system which prevents, when a refrigerating circuit is not operated, an excessive rise of the temperature of hydraulic oil flowing between the hydraulic pump and oil tank.

Another object of the present invention is to provide an air conditioning system which automatically and easily flushes the heating circuit without detaching a valve and which prevents hydraulic oil leakage during flushing.

To achieve these and other objects, an air conditioning system according to the preferred embodiments includes a heating circuit and a refrigerating circuit. The heating circuit has a hydraulic pump driven by a hydraulic motor, a valve mechanism for generating a pressure difference between the entrance and exit sides thereof, an oil pathway selecting means for selecting an oil pathway either immediately back to an oil tank or to a radiator before being sent back to the oil tank. The refrigerating circuit has a compressor driven by the hydraulic motor, a clutch mechanism provided between the hydraulic motor and the compressor for controlling the connection of the hydraulic motor and the compressor, a condenser having a fan and an evaporator. The air conditioning system further comprises an air path through which the air driven by the fan for the condenser passes. At least a part of the heating circuit is disposed in the air path. A sensor senses the temperature of the hydraulic oil in the heating circuit. If the oil flowing immediately back to the oil tank reaches a first predetermined temperature, a control means turns the fan on.

Further, in an air conditioning system according to the preferred embodiments, the valve mechanism may be constructed from a variable relief valve for generating a pressure difference in the hydraulic oil sent from the hydraulic pump. A control means is provided to control, among other things, the operation of the fan. If, while the refrigerant circuit is off, the temperature of the hydraulic oil reaches a first predetermined temperature, a control means turns the fan on to cool hydraulic oil.

Furthermore, an air conditioning system according to a second preferred embodiment comprises a heating circuit, a refrigerating circuit, a filter provided downstream of a valve mechanism in the heating circuit, and a control means for controlling operation modes of the heating circuit and the refrigerating circuit and for controlling the valve mechanism. The control means maintains the pressure difference across the valve mechanism at a minimum for a predetermined time when initially starting the mobile crane. In other words, the valve mechanism is substantially fully opened.

As previously discussed, the oil leaving the hydraulic motor flows along one of two flow paths. The first flow path has the oil flowing from the hydraulic pump bypassing the valve mechanism and flowing immediately to the oil tank (i.e., the hydraulic oil is not supplied to the valve mechanism). The second flow path takes the oil across the valve mechanism. When flowing in the second flow path and the refrigerant circuit is turned off, the temperature of the hydraulic oil is sensed. If the temperature of the oil reaches a first predetermined temperature, the condenser fan is turned on to cool the heating circuit. Accordingly, an excessive rise of the temperature of the hydraulic oil in the heating circuit can be prevented.

In the second preferred embodiment which includes a filter disposed downstream of the valve mechanism, the pressure difference in the hydraulic oil at the valve mechanism is maintained at a minimum for a predetermined time when a heating mode or a dehumidifing and heating mode is first commenced. In other words, the valve mechanism is substantially fully opened. Therefore, any foreign materials contained in the hydraulic oil easily pass through the valve mechanism and are caught by the filter. Thus, at each initial start up, the heating circuit is automatically flushed. Accordingly, there is no detaching and reattaching of the valves and no incidental fluid leakage associated with flushing operation.

Preferred exemplary embodiments of the invention are described with reference to the accompanying drawings which are given by way of example only, and are not intended to limit the present invention.

BRIEF DESCRIPTION OF THE DRAWINGS

FIG. 8 is a schematic side view of a mobile crane vehicle having therein the air condiitoning system according to the present invention.

DETAILED DESCRIPTION OF THE PREFERRED EMBODIMENTS OF THE INVENTION

Figure 1:
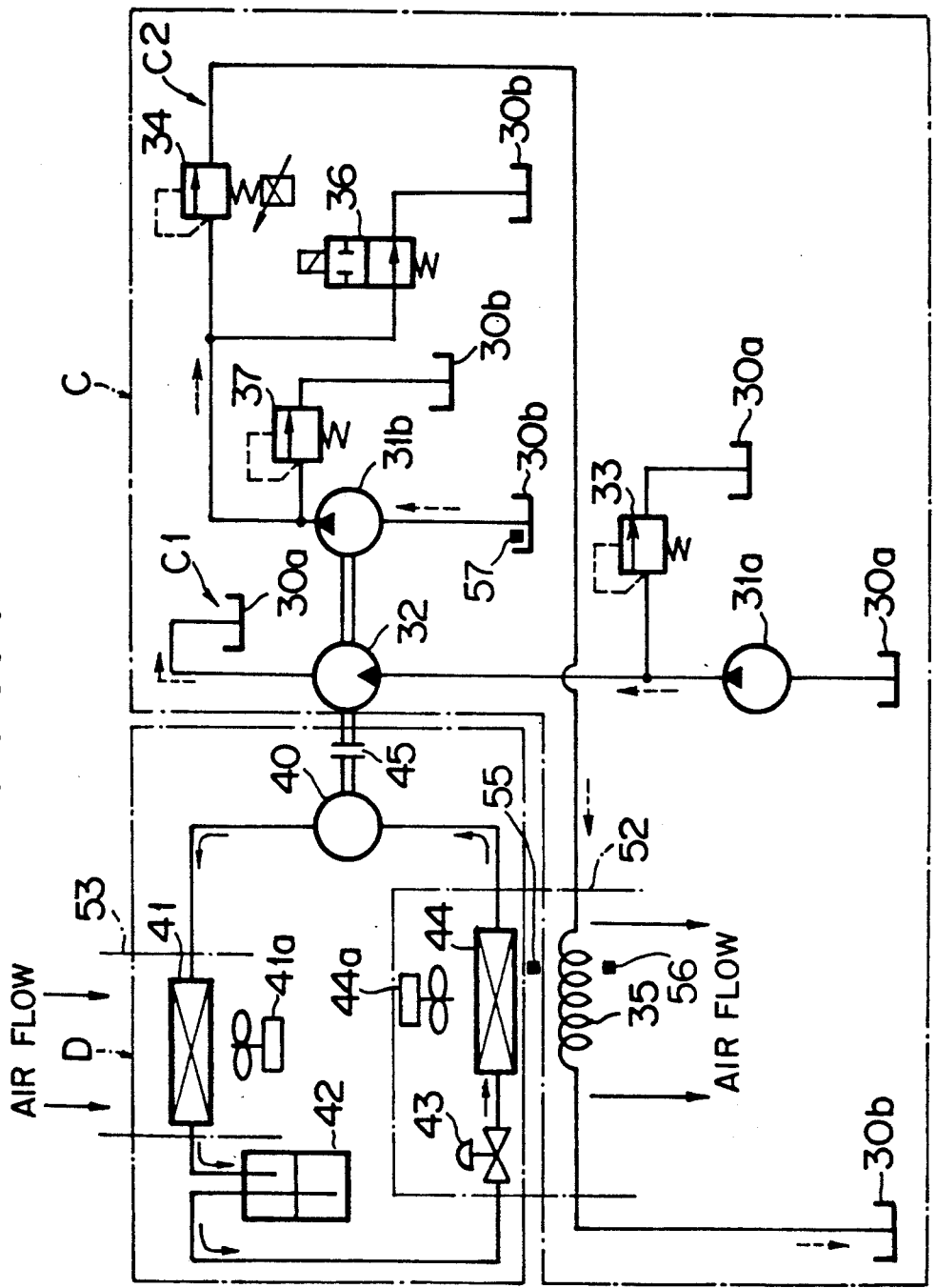
FIG. 1 is a circuit diagram of an air conditioning system according to a first preferred embodiment.

Referring to the drawings, FIG. 1 illustrates a circuit of an air conditioning system according to a first preferred embodiment. The circuit includes a hydraulic circuit C and a refrigerating circuit D. The hydraulic circuit C comprises a hydraulic motor driving circuit C1 and a heating circuit C2.

Hydraulic motor driving circuit C1 comprises a first oil tank 30a, a first hydraulic pump 31a and a hydraulic motor 32. The first hydraulic pump 31a pumps up the hydraulic oil stored in first oil tank 30. The hydraulic motor 32 is driven by the hydraulic oil sent from first hydraulic pump 31a. The first hydraulic pump 31a is driven by an engine of a vehicle on which the system is mounted. A safety valve 33 composed of a relief valve is connected to the exit side of first hydraulic pump 31a for restricting the pressure to hydraulic motor 32.

Heating circuit C2 comprises a second oil tank 30b, a second hydraulic pump 31b, an electromagnetic proportional type relief valve 34, a radiator 35 and a solenoid valve 36 of the normally open type. When solenoid valve 36 is opened, the hydraulic oil pumped up by second hydraulic pump 31b is directly returned to second oil tank 30b through solenoid valve 36. When solenoid valve 36 is closed, the hydraulic oil pumped up by second hydraulic pump 31b is sent to relief valve 34. The hydraulic oil passing through relief valve 34 is sent to radiator 35. The second hydraulic pump 31b is connected to hydraulic motor 32 and driven by the hydraulic motor. A safety valve 37 composed of a relief valve is connected to the exit side of second hydraulic pump 31b for restricting the pressure to relief valve 34 and solenoid valve 36.

The relief valve 34 can generate a pressure difference in the hydraulic oil sent from second hydraulic pump 31b. The hydraulic oil is heated by the pressure difference. The heating value generated by this pressure difference is expressed by the following equation.

$$H = 1.41 \times Q \times \Delta P$$

where,
H: heating value (kcal/h)
Q: flow rate of hydraulic oil (l/min)
$\Delta P$: pressure difference (kgf/cm$^2$)
1.41: constant Accordingly, the heat radiated from radiator 35 is in proportion to the pressure difference (relief pressure) across relief valve 34.

Refrigerating circuit D comprises a compressor 40, a condenser 41, a receiver 42, an expansion valve 43 and an evaporator 44 disposed in series. The condenser 41 and the evaporator 44 exchange heat with the air flowing thereacross due to fans 41a and 44a, respectively. Compressor 40 is selectively drivingly connected to hydraulic motor 32 via a clutch mechanism 45.

Referring to FIG. 8, fan 44a, evaporator 44 and radiator 35 are disposed in an air conditioning air duct 52 placed in a cabin 50 of mobile crane a vehicle. A damper 53 is provided in the air conditioning air duct 52 for switching the air path in the air duct between an air path for heating and an air path for air cooling. When heating or dehumidification and heating are performed, the air in cabin 50 is sucked through a suction opening 54 and the air is discharged into cabin 50 through evaporator 44 and radiator 35. When air cooling is performed, the air is discharged into cabin 50 after passing only through evaporator 44. One such air delivery system is disclosed in U S. Pat. No. 5,085,269, which is hereby incorporated by reference. A first temperature sensor 55 (shown in FIG. 2) is provided downstream of evaporator 44 and a second temperature sensor 56 (shown in FIG. 2) is provided downstream of radiator 35, respectively.

At least a part of heating circuit C2 is disposed in an air path 53 in which the air forced by fan 41a flows across condenser 41. Accordingly, the hydraulic oil circulated in heating circuit C2 is cooled when fan 41a is activated.

Figure 2:
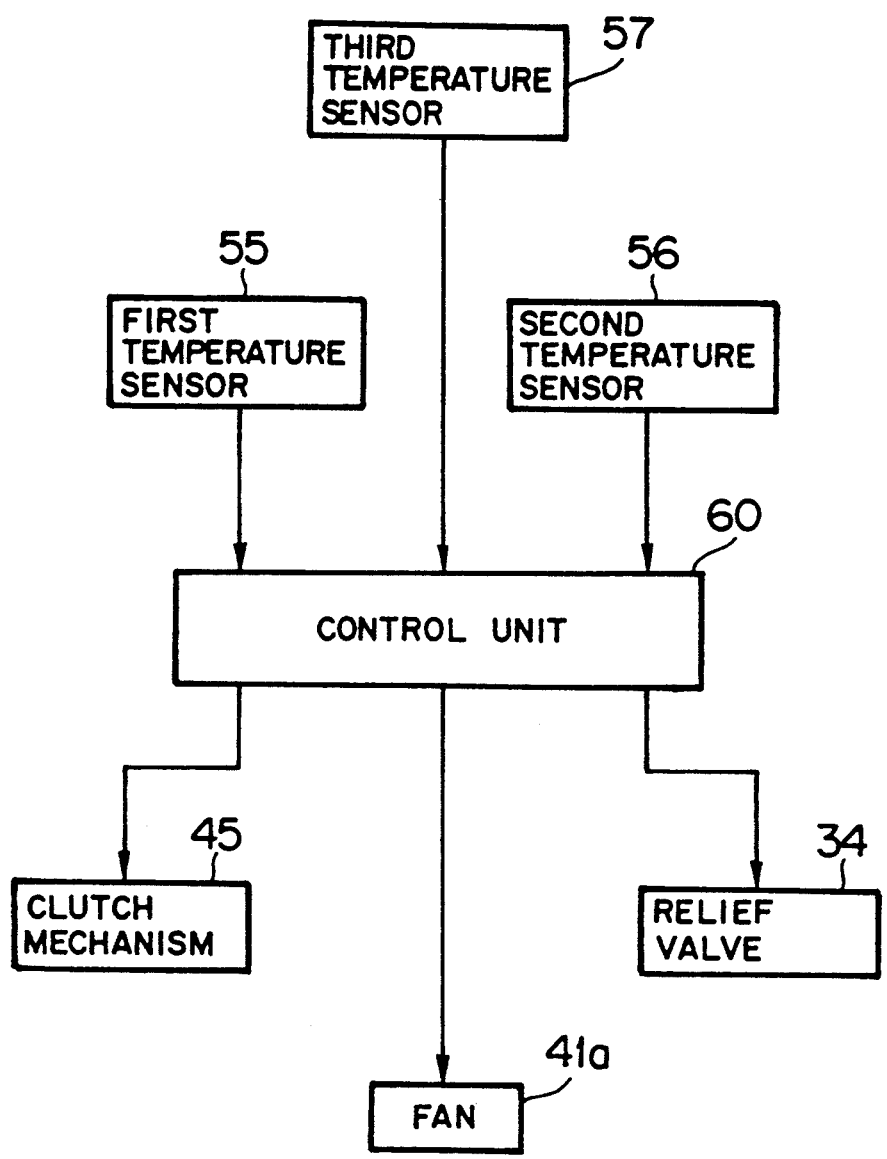
FIG. 2 is a block diagram of a control system for the air conditioning system shown in FIG. 1.

The control of the above embodiment will be explained with reference to FIGS. 2 and 3.

Relief valve 34 and clutch mechanism 45 are controlled by a control unit 60. Additionally, control unit 60 is connected to first and second temperature sensors 55 and 56. Control unit 60 controls clutch mechanism 45 in response to the temperature detected by first temperature sensor 55 and based on a preset temperature. Control unit 60 controls the relief pressure of relief valve 34 in response to the temperature detected by second temperature sensor 56 and based on a preset temperature.

In the operation of air cooling, a signal is outputted from control unit 60 for connecting or disconnecting clutch mechanism 45 to control the ON/OFF operation of compressor 40. In the operation of heating, the relief pressure of relief valve 34 is controlled within the range of lower limit Pmin to upper limit Pmax. In the operation of dehumidification and heating, both air cooling and heating are performed. ON time Ta (for example, 20 seconds) and OFF time Tb (for example, 10 seconds) of compressor 40 and at least two upper limits with respect to the relief pressure, for example, Pmax and ½ Pmax are set in control unit 60. In the operation of dehumidification and heating, the ON/OFF operation of compressor 40 is repeated at each ON time Ta and each OFF time Tb. The relief pressure of relief valve 34 is controlled to Pmax when compressor 40 is OFF, and the relief pressure is controlled to ½ Pmax when compressor 40 is ON.

More specifically, when heating is performed, clutch mechanism 45 disconnects hydraulic motor 32 and compressor 40, solenoid valve 36 is closed, and fan 44a is driven. The hydraulic oil pumped up by second hydraulic pump 31b circulates in the order of relief valve 34, radiator 35 and second oil tank 30b, as shown by the broken line arrows in FIG. 1. When the hydraulic oil passes through the relief valve 34, a pressure difference is generated between the entrance and exit sides thereof so that the hydraulic oil is heated. The heat of the hydraulic oil is radiated by radiator 35, and the air in air conditioning air duct 52 which is forced by fan 44a is heated by the radiator 35. Thus, the cabin is heated.

When air conditioning (air cooling) is performed, hydraulic motor 32 and compressor 40 are connected by clutch mechanism 45, and fans 41a and 44a are driven. The hydraulic oil pumped by first hydraulic pump 31a circulates through hydraulic motor 32 as shown by the broken line arrows in FIG. 1, and hydraulic motor 32 is driven. Compressor 40 is driven by hydraulic motor 32, and the refrigerant discharged by compressor 40 circulates in the order of condenser 41, receiver 42, expansion valve 43, evaporator 44 and the compressor 40, as shown by the solid line arrows in FIG. 1. The air in air conditioning air duct 52 which is forced by fan 44a is cooled at evaporator 44. Thus, the air in the cabin is cooled. In this operation, solenoid valve 36 is open.

When dehumidification and heating are performed, hydraulic motor 32 and compressor 40 are intermittently connected for the predetermined time Ta and disconnected for the predetermined time Tb by clutch mechanism 45, solenoid valve 36 is closed, and fans 41a (driven only when clutch mechanism 45 is connected) and fan 44a are driven. The refrigerant discharged by compressor 40 circulates in the same way as in air cooling operation as shown by the solid line arrows in FIG. 1, and the air in air conditioning air duct 52 is dehumidified and cooled by evaporator 44. The hydraulic oil pumped by second hydraulic pump 31b is circulated in the same manner as the heating operation as shown by the broken line arrows in FIG. 1, and the air in air conditioning air duct 52 is heated by radiator 35. The heating by radiator 35 and the dehumidification and cooling by evaporator 44 thus perform the dehumidification and heating of the cabin. In this operation, the relief pressure of relief valve 34 is maintained at ½ Pmax by control unit 60 when compressor 40 is ON.

The above heating circuit is disposed in air path 53 of fan 41a. A third temperature sensor 57 (shown in FIG. 2) is provided in the heating circuit for detecting the temperature of the hydraulic oil circulated in the heating circuit. The third temperature sensor 57 is disposed, for example, in second oil tank 30b, and is connected to control unit 60. Further, fan 41a is connected to control unit 60.

Figure 3:
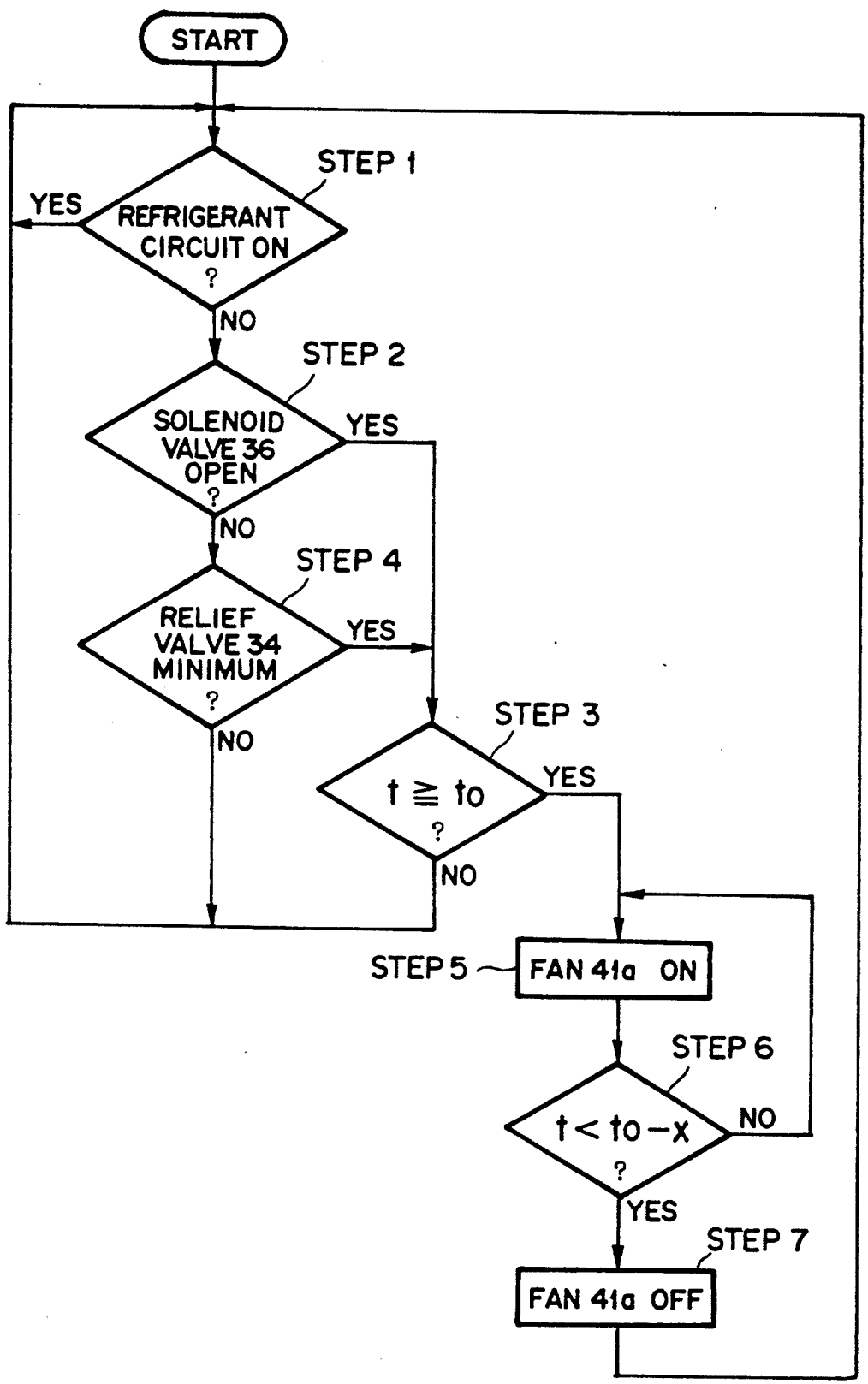
FIG. 3 is a flowchart of a control system for the air conditioning system shown in FIG. 1.

FIG. 3 illustrates a flow chart detailing the operation for preventing the occurrence of an excessive temperature rise of the hydraulic oil.

First, control unit 60 checks whether the refrigerant circuit is operating (step 1). If the refrigerant circuit is operating, the determination of the step 1 is repeated. If the refrigerant circuit is not operating, that is, if fan 44a is not on, it is determined whether solenoid valve 36 is opened (step 2). If the solenoid valve 36 is opened, the flow proceeds to step 3 described later. If the solenoid valve 36 is closed, it is determined whether the pressure difference of relief valve 34 is at the minimum pressure difference (step 4).

If the pressure difference of relief valve 34 is at the minimum pressure difference, namely, if the opening degree of the relief valve 34 is at the maximum opening degree, the flow proceeds to step 3. If the opening degree of relief valve 34 is not at the maximum opening degree, the flow returns to step 1.

At step 3, the temperature of the hydraulic oil (t) detected by third temperature sensor 57 is compared with a maximum temperature of the hydraulic oil ($t_0$) preset in control unit 60. If $t < t_0$, the flow returns to step 1. If $t \geq t_0$ fan 41a is driven by the signal from control unit 60 (step 5). Since, as described above, the heating circuit is disposed in air path 53 of fan 41a, the hydraulic oil in the heating circuit is cooled by the air forced through air path 53 by the fan 41a.

Therefore, an excessive rise of the temperature of the hydraulic oil is prevented.

Further, after fan 41a is driven, it is determined whether the relationship between the detected temperature of the hydraulic oil (t) and the preset maximum temperature of the hydraulic oil ($t_0$) satisfies $t < t_0 - x$ ("x" is a safety constant) (step 6). If the relationship is not satisfied, the flow returns to step 5. If the relationship is satisfied, the drive of fan 41a is stopped (step 7), and the flow returns to step 1.

Figure 4:
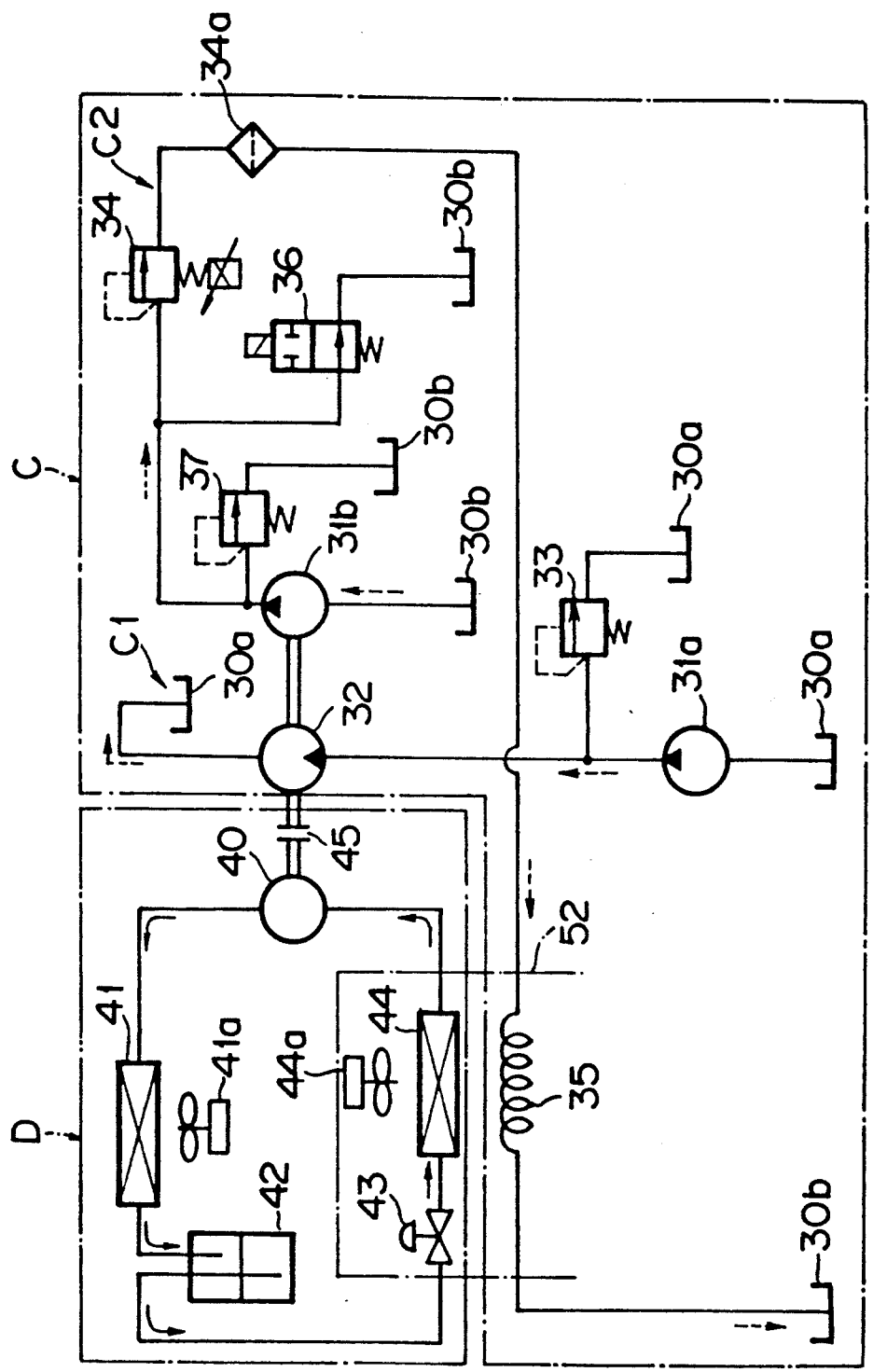
FIG. 4 is a circuit diagram of an air conditioning system according to a second preferred embodiment.

FIG. 4 illustrates a circuit of an air conditioning system according to a second preferred embodiment. In this embodiment, a filter 34a is provided at a position downstream of relief valve 34 in heating circuit C2. Other parts of this circuit are substantially the same as the first preferred embodiment.

Figure 5:
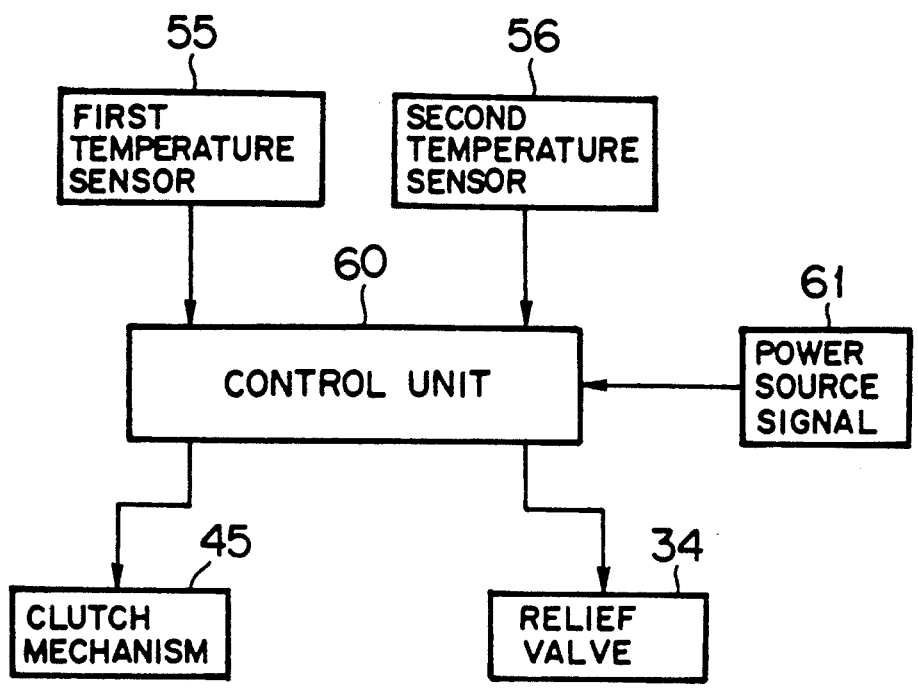
FIG. 5 is a block diagram of a control system for the air conditioning system shown in FIG. 4

FIG. 5 illustrates a block diagram for the control of this embodiment. Although the block diagram is almost the same as that in the first embodiment shown in FIG. 2, a power source signal 61 from a firm power source (not shown) for control unit 60 is illustrated in FIG. 5. This firm power source is different from a power source for actually activating the relief valve, the solenoid valve and the damper. That is, the firm power source is provided separately from a main power source, and it is used for always supplying a power to control unit 60.

In this embodiment, foreign materials contained in the hydraulic oil are caught by filter 34a disposed between relief valve 34 and radiator 35.

Figure 6:
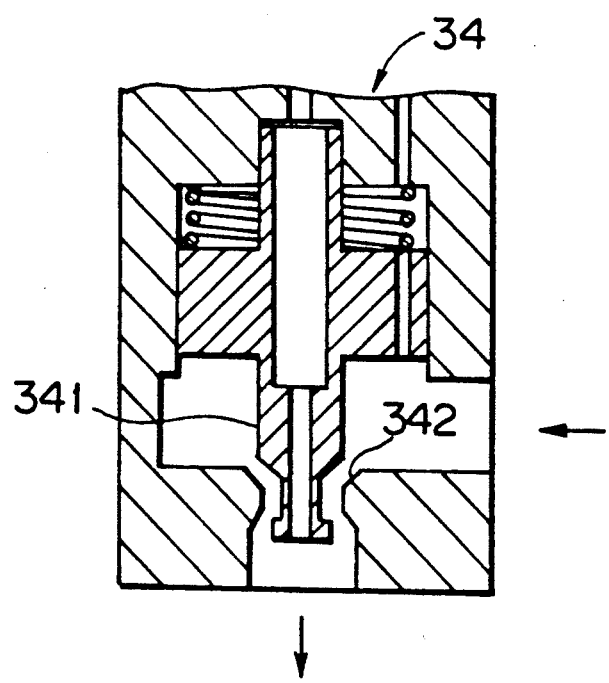
FIG. 6 is an enlarged partial vertical sectional view of a relief valve used in a heating circuit of the air conditioning system shown in FIG. 4.

When the operation of heating or dehumidification and heating is first started after power source signal 61 from the firm power source is inputted to control unit 60, the relief pressure (pressure difference) of relief valve 34 is controlled to a minimum pressure Pmin for a predetermined time. More specifically, as shown in FIG. 6, the opening degree of relief valve 34 is controlled to a maximum opening degree, and the gap between valve body 341 and valve seat 342 is enlarged. As a result, the foreign materials contained in the hydraulic oil can easily pass through relief valve 34 and are caught by filter 34a. Thus, the heating circuit is automatically flushed without detaching relief valve 34 each time the operation mode of heating or dehumidification and heating is first started.

The firm power source is electrically connected to control unit 60 usually by connecting a power source harness to a battery, and electrically disconnected by detaching the power source harness from the battery. Since the power source harness is disconnected from the battery every time the system is serviced, the signal of the firm power source is automatically turned off during system maintenance. Since the power source harness is again connected to the battery after the maintenance or checking, the signal of the firm power source is automatically inputted at every maintenance or checking. Therefore, flushing is automatically performed at every maintenance or checking of the system.

Figure 7:
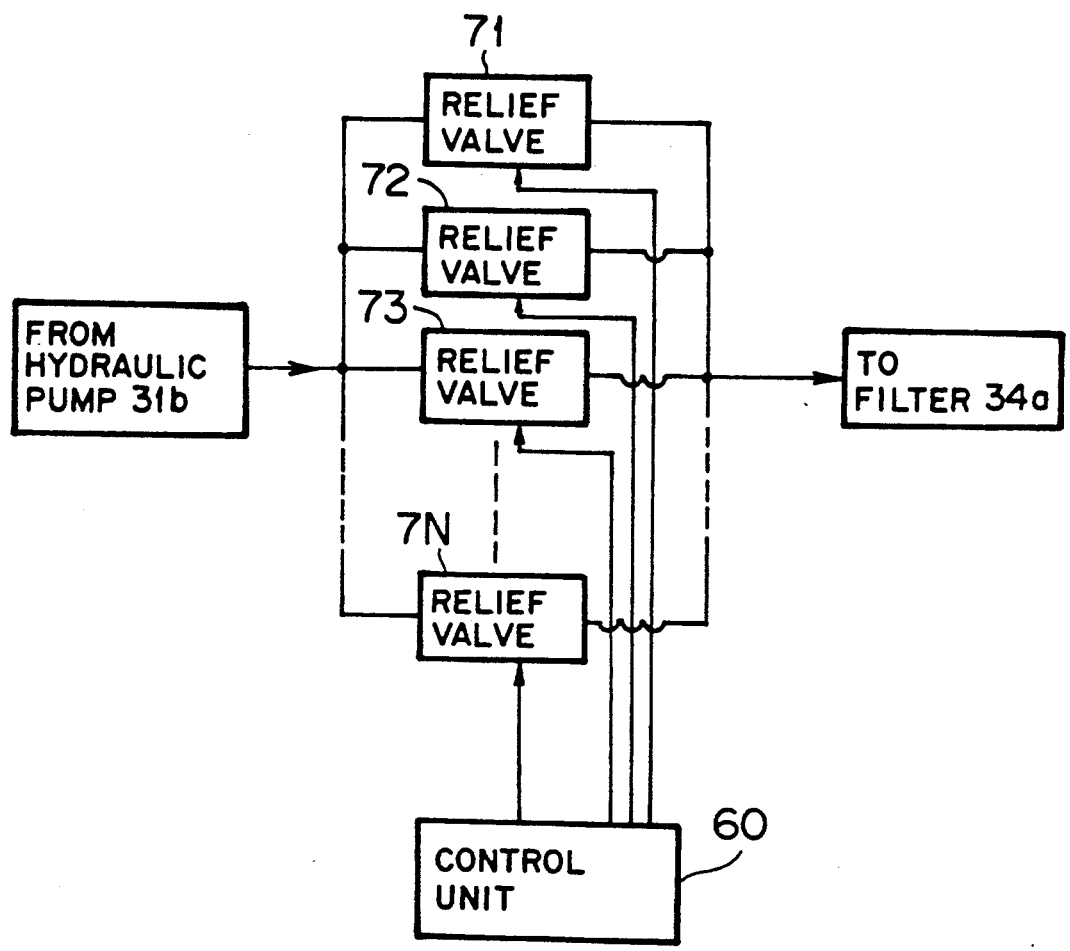
FIG. 7 is a partial block diagram of an air conditioning system according to a third preferred embodiment.

FIG. 7 illustrates a block diagram of a part of a circuit of an air conditioning system according to a third preferred embodiment. In this embodiment, the valve mechanism for causing the pressure difference in the hydraulic oil of the heating circuit comprises a plurality of relief valves 71, 72, 73, . . .7N each having a constant relief pressure. For example, relief valve 71 has a minimum relief pressure and relief valve 7N has a maximum relief pressure.

When control unit 60 receives a input signal from a firm power source, relief valve 71 having the minimum relief pressure may be selected and the relief valve 71 may be turned on for a predetermined time. In other words, a relief valve having a maximum opening degree is selected. After the predetermined time expires, another suitable relief valve is selected from the plurality of relief valves.

Although several preferred embodiments have been described, it will be appreciated by those skilled in the art that various modifications and alterations can be made to these embodiments without materially departing from the novel teachings and advantages of this invention. Accordingly, it is to be understood that all such modifications and alterations are included within the scope of the invention as defined by the following claims.

I claim:

1. An air conditioning system for vehicles comprising:
    a heating circuit comprising a hydraulic pump, a hydraulic motor for driving said hydraulic pump, and a radiator for radiating heat of hydraulic oil flowing in said heating circuit;
    a refrigerant circuit comprising a compressor driven by said hydraulic motor, a clutch mechanism provided between said hydraulic motor and said compressor for controlling the connection of said hydraulic motor and said compressor, a condenser, a cooling fan for forcing a stream of air across said condenser, and an evaporator;
    a first fluid pathway in said hydraulic circuit defined between said radiator and said hydraulic pump and a second fluid pathway extending in parallel to said first fluid pathway;
    a valve mechanism disposed in said first fluid pathway for generating a pressure difference in the hydraulic oil flowing therethrough;
    an oil pathway switching means disposed in said hydraulic circuit for switching the flow of the hydraulic oil between said first fluid pathway in which said valve mechanism is disposed and said second fluid pathway;
    an air path through which the air forced by said fan passes, wherein at least a portion of said heating circuit is disposed in said air path;
    a sensor for sensing a temperature of the hydraulic oil in said heating circuit; and
    a control means for turning said fan on when said temperature of the hydraulic oil flowing in said heating circuit rises to a first predetermined temperature.

2. An air conditioning system of claim 1, said control means additionally turning said fan on when said refrigerant circuit is not operating and the oil flows through said second fluid pathway above said first predetermined temperature.

3. An air conditioning system of claim 1, said valve mechanism generating a variable pressure thereacross, said control means additionally turning said fan on when said refrigerant circuit is not operating and the oil flows through said first fluid pathway above said first predetermined temperature with said valve mechanism fully opened.

4. An air conditioning system of claim 3, said valve mechanism comprising an electromagnetic proportional type relief valve.

5. An air conditioning system of claim 1, said control means turning said fan off when the temperature of the hydraulic oil drops below a second predetermined temperature which is lower than said first predetermined temperature.

6. The air conditioning system of claim 1 wherein said hydraulic system is mounted on a work vehicle.

7. The air conditioning system of claim 6 wherein said work vehicle comprises a mobile crane.

8. An air conditioning system for vehicles comprising:
    a heating circuit comprising a hydraulic pump, a hydraulic motor for driving said hydraulic pump, and a radiator for radiating heat of hydraulic oil flowing in said heating circuit;
    a refrigerant circuit comprising a compressor driven by said hydraulic motor, a clutch mechanism provided between said hydraulic motor and said compressor for controlling the connection of said hydraulic motor and said compressor, a condenser, a cooling fan for forcing a stream of air across said condenser, and an evaporator;
    a fluid pathway in said hydraulic circuit defined between said radiator and said hydraulic pump;
    a valve mechanism disposed in said fluid pathway for generating a pressure difference in the hydraulic oil flowing therethrough;
    an air path through which the air forced by said fan passes, wherein at least a portion of said heating circuit is disposed in said air path;
    a sensor for sensing a temperature of said hydraulic oil in said heating circuit; and
    a control means for turning said fan on when said temperature of the hydraulic oil flowing in said heating circuit rises to a first predetermined temperature.

9. An air conditioning system of claim 8, said control means turning said fan on when said refrigerant circuit is not operating and the hydraulic oil rises above said first predetermined temperature.

10. An air conditioning system of claim 8, said control means turning said fan on when said refrigerant circuit is not operating and the oil flows through said fluid pathway above said first predetermined temperature with said valve mechanism fully opened.

11. An air conditioning system of claim 10, said valve mechanism comprising an electromagnetic proportional type relief valve.

12. An air conditioning system of claim 8, said control means turning said fan off when the temperature of said hydraulic oil drops below a second predetermined temperature which is lower than said first predetermined temperature.

13. The air conditioning system of claim 8 wherein said hydraulic system is mounted on a work vehicle.

14. The air conditioning system of claim 13 wherein said work vehicle comprises a mobile crane.

15. A method of conditioning air in a vehicle having a hydraulic heating circuit and a refrigerant circuit, said hydraulic circuit comprising a hydraulic pump driven by a hydraulic motor, a radiator for radiating heat of hydraulic oil flowing in said heating circuit, a first fluid pathway in said hydraulic circuit defined between said radiator and said hydraulic pump and a second fluid pathway extending in parallel to said first fluid pathway, a valve mechanism disposed in said first fluid pathway for generating a pressure difference in the hydraulic oil flowing therethrough, an oil pathway switching means disposed in said hydraulic circuit for switching the flow of the hydraulic oil between said first fluid pathway in which said valve mechanism is disposed and said second fluid pathway; said refrigerant circuit comprising a compressor driven by said hydraulic motor, a clutch mechanism provided between said hydraulic motor and said compressor for controlling the connection of said hydraulic motor and said compressor, a condenser, a cooling fan upstream of said condenser, an evaporator, and an air path through which the air forced by said fan passes, wherein at least a portion of said heating circuit is disposed in said air path, said method comprising the steps of;

determining whether said refrigerant circuit is driven by said clutch mechanism;

determining whether said oil pathway switching means is directing the oil to flow through said first fluid pathway or through said second fluid pathway;

sensing a temperature of said hydraulic oil in said heating circuit; and turning said fan on when said refrigerant circuit is not operating and the oil flowing through said second fluid pathway rises above a first predetermined temperature.

16. The method according to claim 15 further comprising the step of turning said fan off when the temperature of the hydraulic oil drops below a second predetermined temperature which is lower than said first predetermined temperature.

17. A method of conditioning air in a vehicle having a hydraulic heating circuit and a refrigerant circuit, said hydraulic circuit comprising a hydraulic pump driven by a hydraulic motor, a radiator for radiating heat of hydraulic oil flowing in said circuit, a first fluid pathway in said hydraulic circuit defined between said radiator and said hydraulic pump, a valve mechanism disposed in said first fluid pathway for generating a pressure difference in the hydraulic oil flowing therethrough, said valve mechanism operating between a fully opened and a fully closed position, and said refrigerant circuit comprising a compressor driven by said hydraulic motor, a clutch mechanism provided between said hydraulic motor and said compressor for controlling the connection of said hydraulic motor and said compressor, a condenser, a cooling fan upstream of said condenser, and evaporator, and an air path through which the air forced by said fan passes, wherein at least a portion of said heating circuit is disposed in said air path, said method comprising the steps of;

determining whether said refrigerant circuit is driven by said clutch mechanism;

determining whether said valve mechanism is in the fully opened position;

sensing a temperature of said hydraulic oil in said heating circuit; and turning said fan on when said refrigerant circuit is not operating and the oil flows through said first fluid pathway above a first predetermined temperature with said valve mechanism in the fully opened position.

18. The method according to claim 17 further comprising the step of turning said fan off when the temperature of the hydraulic oil drops below a second predetermined temperature which is lower than said first predetermined temperature.

* * * * *